April 16, 1968     W. L. TUNNELL     3,378,174

SPREADING APPARATUS FOR DRY POWDERED MATERIAL

Filed Nov. 29, 1966     2 Sheets-Sheet 1

INVENTOR
W. L. Tunnell

BY

ATTORNEY

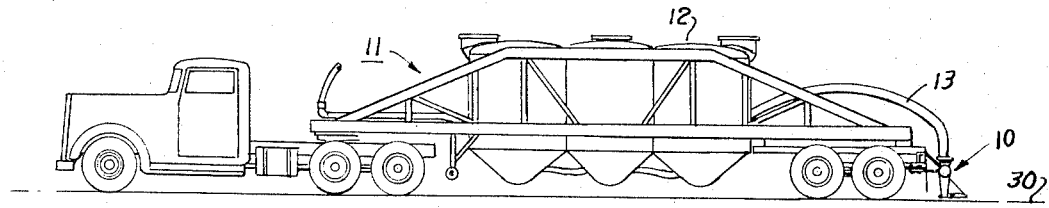
Fig. 1-A
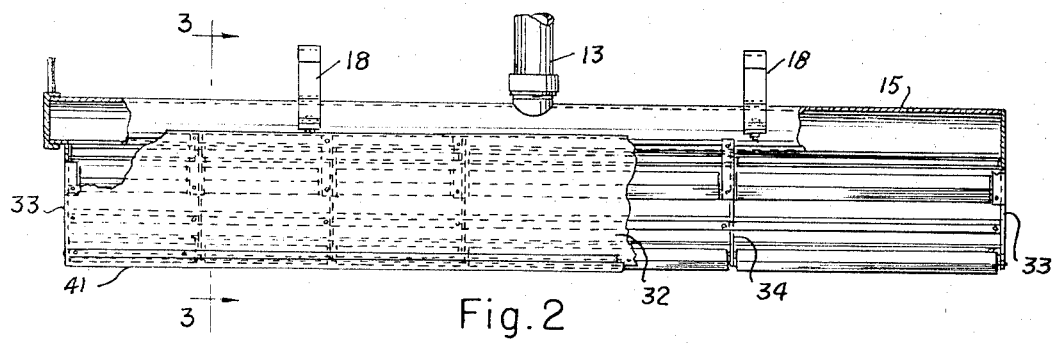
Fig. 2
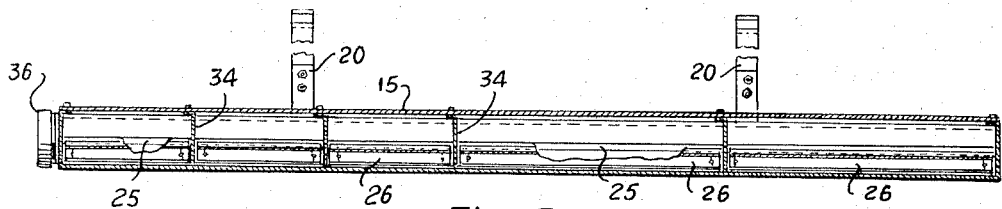
Fig. 5
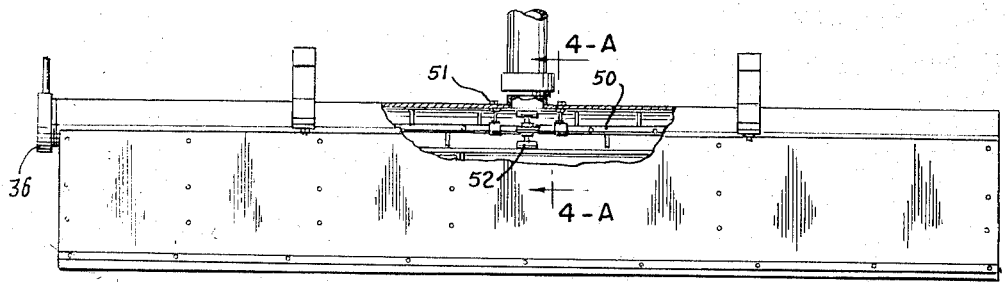
Fig. 4
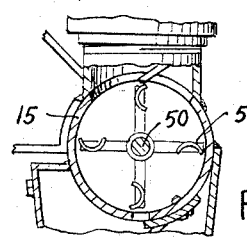
Fig. 4-A
INVENTOR
W. L. Tunnell
BY
ATTORNEY United States Patent Office 3,378,174
Patented Apr. 16, 1968

3,378,174
SPREADING APPARATUS FOR DRY
POWDERED MATERIAL
Winfred L. Tunnell, 4211 Brindwell, Tyler, Tex. 75701
Filed Nov. 29, 1966, Ser. No. 597,683
10 Claims. (Cl. 222—193)

ABSTRACT OF THE DISCLOSURE

There is disclosed an apparatus for spreading dry powdered material such as dry cement or lime that includes an elongated tube into which the material to be spread is blown under pressure. The lower side of the tube defines a restricted aperture means, which may be a slot, whereby material blown into the tube is forced out through the aperture. There is also provided a housing extending from the tube to a position which would be just above the surface onto which the material is to be spread. The housing includes a plurality of baffles intercepting the path of the material whereby the dry powdered material is separated from the air which conveys it into the tube as the material travels down the housing. The area of the restricted aperture is substantially less than the exit port in order that the air separated from the powdered material can exit from the housing without the powdered material becoming entrained in the air.

In road construction, soil cement is one of the materials widely used at present for roadbeds or in some cases for the road surface itself. Soil cement is prepared by first spreading dry powdered cement along a roadbed which has been suitably graded. The roadbed is tilled to mix the cement with the soil to a depth of a few inches and then the bed is rolled, after which a predetermined amount of water is sprinkled on the mixture causing the cement-soil mixture to set, producing a hard permanent bed. In preparing soil cement roadbeds or the like, it is important that the dry cement be spread evenly along the bed, and that the amount spread be quite accurately metered. In addition to the usual requirement that an operation of this type be performed in the field quickly with a minimum of equipment and operators, it is very important that the cement spreading operation not produce a cloud of cement dust. It has been observed that when using cement spreading equipment of conventional form under windy conditions a large cloud of dust may be generated which can extend as far as one-half mile from the roadbed. This not only contributes to the general pollution of the atmosphere, but also has resulted in defoliation of trees and shrubs in the vicinity of the new highway. For these reasons, it has been often necessary to terminate the cement spreading operation when weather conditions include more than a gentle breeze, resulting in many days delay in road building schedules.

The most common spreading arrangement in use today for the propose of spreading dry cement or lime consists of a train of equipment including a conveyor belt type of spreader onto which the cement-air mixture is blown through a hose. The conveyor arrangement is usually self supported on a wheeled vehicle which is often pulled by a separate tractor. In addition to these pieces of equipment, the cement delivery truck is needed which requires a driver and man on the rear to manipulate the delivery valves. To keep this train of equipment moving at a constant speed, a maintainer vehicle such as a tractor usually pulls the entire assembly. This train of equipment requires three drivers and three additional men for the unloading operation, one on the cement truck and two operating the conveyor type spreader. The two men operating the spreader are under extremely adverse dust conditions and even if limited to only short periods of this work per day are nevertheless under a severe health hazarad. Even with this cumbersome and expensive rig, the accuracy of spread is not always to specifications and the dust created is such that damage adjacent the right of way occurs even if operations are suspended when windy conditions exist. Another undesirable feature of the spreading equipment presently used is the difficulty in getting rid of "over run." By this term is mean the excess cement which remains after running the spreader over the prescribed length of roadbed. The amount of cement ordered for a given section of roadbed is always conservatively estimated to make such there will be an excess rather than not enough. Thus, for a 1500 foot spread on a given day, cement is ordered for perhaps 1550 feet length, 21 feet wide, at say 40 lbs./square yard. Due to various conditions such as humidity, temperature, cement grind, etc., the over run would be up to perhaps 150 feet; it being noted that three passes of about 7 feet width are made to get the 21 feet width. The cement must be unloaded once delivered, and cannot be dumped off the right of way; thus the practice is to unload it by doubling back over the spread, producing a short section which has double the required amount of cement per square yard.

The water is sprinkled on at a rate calculated on the basis of 40 lb./ yd. of cement, so in the overrun the wrong quantity of water is present, producing flash setting which causes a bump or washboard effect on the completed roadway.

It is therefore the principal object of this invention to provide improved apparatus for spreading dry powdered material such as cement or lime from an air type delivery truck in an accurate yet inexpensive manner which minimizes the cloud of dust ordinarily raised by this type of equipement. It is also an object to provide a versatile yet simple and compact piece of equipment which may be operated with a minimum of manpower and which may be handled easily for spreading either on a straight path or in odd shaped areas. Another object is to provide spreading apparatus which reduces the problems caused by overrun as encountered with conventional equipment.

In accordance with this invention, a spreader assembly is provided which may be readily attached to or hung from the rear of a cement tank truck, requiring no additional vehicles or pieces of equipment. The spreader assembly comprises a transverse tube or cylinder to which the cement or lime is delivered by a large hose under air pressure and from which the material exists through a slot in the lower side. The width of the slot may be varied to control the thickness of spread or to account for uneven spread. Also, segments of the slot may be shut to vary the width of spread. The dry powdered material after leaving the slot passes down over a series of baffles which function to separate the cement or lime from the air and deposit it upon the roadbed or work surface with a minimum of dust. A screen or flap may be provided in front of the outlet from the baffles, and a canopy positioned over the rear of the outlet, to further reduce the dust. The spreader assembly according to this invention requires no operators at the equipment, except perhaps a man on the tank truck to operate the outlet valves although this is done by the driver in some cases. The spread of dust is reduced to an extent such that no dust is distributed outside the right of way and operations can be continued even on quite windy conditions. Since cement or lime will be delivered from the hose at a quite constant rate for constant air pressure, the accuracy of spread may be closely controlled by attention to the truck speed which can be maintained quite precise by using a tachometer if desired. Further, the overrun may be distributed by doubling back over the spread at a much faster speed so that the excess is spread over a large area which will not greatly affect the finished consistency.

The novel features believed characteristic of this invention are set forth in the appended claims. The invention itself, however, as well as further objects and advantages thereof, will best be understood by reference to the following detailed description of particular embodiments, read in conjunction with the accompanying drawings wherein:

FIGURE 1a is a side view of the truck of FIGURE 1 with the spreading apparatus in place;

FIGURE 2 is an elevation view partly broken away and partly in section of the spreader arrangement of FIGURE 1;

FIGURES 3a and 3b are detail views in perspective of parts of the spreader assembly of FIGURES 1-5;

FIGURE 4 is a front elevation view, partly broken away, of another embodiment of the spreader of this invention having an impeller for aiding in distributing the material;

FIGURE 4a is a detail sectional view of the apparatus of FIGURE 4, taken along the line 4a—4a; and FIGURE 5 is a sectional view of the apparatus of FIGURE 3 taken along the line 5—5 in FIGURE 3.

Figure 1:
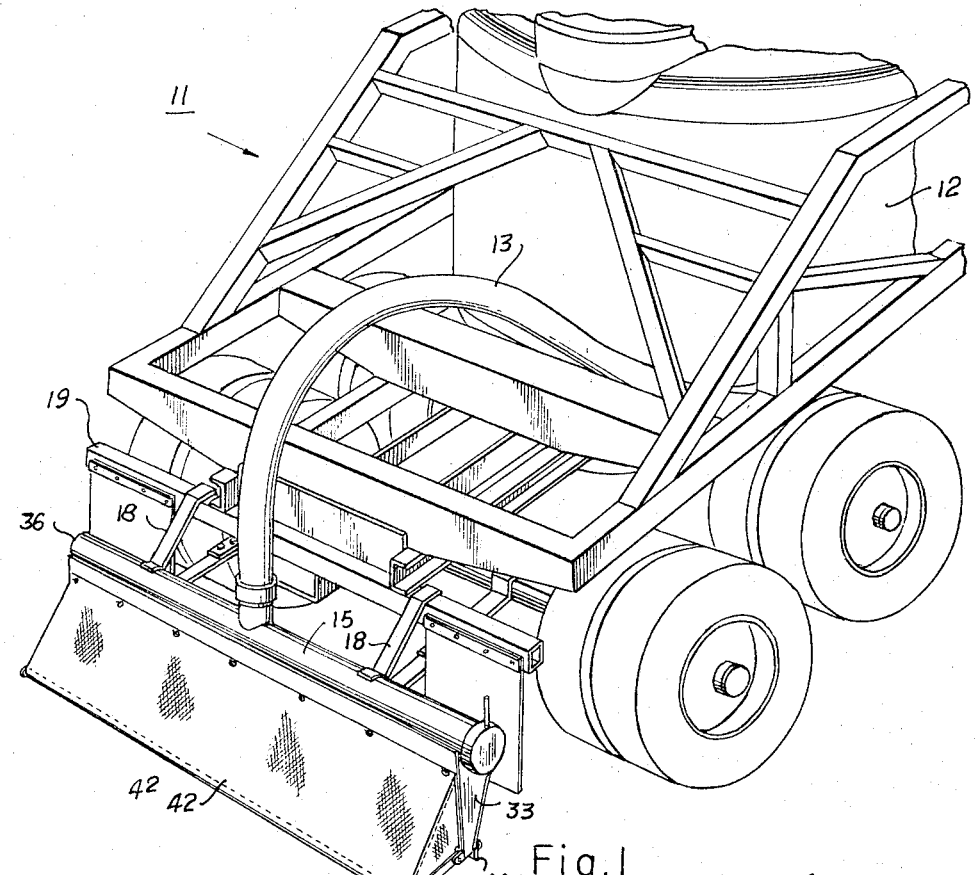
FIGURE 1 is a pictorial view of the spreading apparatus of this invention shown connected in an operative position on the rear end of a tank truck.

With reference now in particular to FIGURE 1, it will be noted that the spreader of this invention is a simple and inexpensive, yet accurate and reliable arrangement for dispensing dry powdered material such as cement or lime along a roadbed from a tank truck from which the powdered material is forced by air under pressure. The apparatus of this invention comprises a spreader assembly 10 adapted for temporary attachment to the rear end of a wheeled vehicle 11 which would ordinarily comprise a truck having large tanks 12 mounted on the bed thereof. The tanks 12 contain a large quantity of dry, powdered material such as dry cement or lime which in accordance with present practice is delivered to the user by forcing out through a large flexible hose 13 by air pressure. Ordinarily, dry cement may be dispensed under perhaps 15 to 20 p.s.i. air pressure, while lime would be dispensed under perhaps 8 p.s.i. pressure, under which conditions the powdered material may be handled almost as if it were fluid.

The spreader assembly 10 comprises an elongated tube or cylinder 15 with the flexible hose 13 being connected at about the midpoint of the tube by means of a suitable hose coupling. Of course a manually operated valve (not shown) may be provided for regulating the amount of material dispensed. The assembly 10 including the cylinder 15 is detachably mounted on the vehicle 11 by means including a pair of hook members 18 which extend over a part of the vehicle such as a bumper 19. The members 18 are welded or otherwise secured to the cylinder 15. In addition, a pair of struts 20 extend from the cylinder 15 to another fixed part of the vehicle 11 such as, for example, an axle 21. These struts 20 are preferably removable by means of bolts as shown since these members are often not necessary. One end of each of the struts 20 is welded or otherwise secured to the cylinder 15 while the other end includes an abutting portion for engaging the axle 21. It will thus be seen that the spreader assembly may be quickly secured to a conventional vehicle of the type used for conveying dry cement or lime.

In the spreader assembly 10, the cylinder 15 which receives the powdered material in a semifluid form from the hose 13, dispenses the material into a baffle assembly as will be subsequently described by means of a slot 25 running the length of the lower side thereof. The effective width of this slot, and thus the quantity of material delivered to the baffle assembly, may be adjusted by means of a plurality of strips 26 which are secured to the cylinder 15 by a number of set screws passing through slots in the strips 26 so that the strips may be positioned to cover or expose the desired portion of the slot 25. Secured to the strips 26, or forming a part thereof, is the first of a series of baffles 27. These baffles function to separate the dry powdered material from the air which has served to convey the material through the tank 12 out through the hose and through the cylinder 15. As the mixture of air and powdered material is forced through the slot 25 it is directed by the upper baffle onto the series of other baffles 27, where the dry material and air are separated, on down through a lower opening 28 from which the material is deposited on a roadbed 30. It will be found that the powdered material will be deposited on the surface 30 in a manner such that very little dust will occur as a result of the spreading operation. Also the amount of the material spread per square foot along the width of the roadbed will be quite even.

Figure 3:
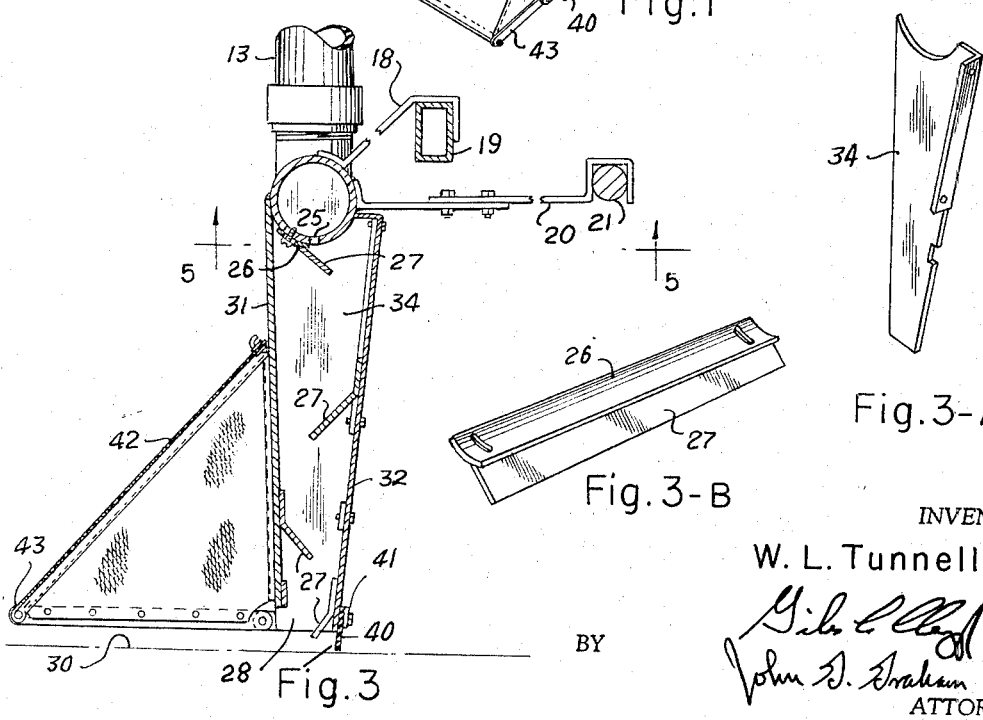
FIGURE 3 is an elevation view in section of the spreader of FIGURES 1 and 2 taken along the line 3—3 of FIGURE 2.

One of the baffles 27 is secured to a back cover plate 31 while the remaining two are secured to a front cover plate 32. It will be noted that the back cover plate 31 is slightly shorter than the front cover plate 32 as best seen in FIGURE 3. End plates 33 of course prevent the material from escaping except through the opening 28. The front cover plate is removable for the purpose of cleaning, etc. These cover plates form a housing for the baffles which is wider at the top than at the bottom and is slightly wider at the top than the diameter of the tube 15. The brace members 34 include vertical plates which confine the vertical path of the material after it leaves the slot 25 so that the width of the spread may be regulated. To this end, one or more the strips 26 may be positioned to completely close off the slot 25 as may be best seen in FIGURE 5. For example, if the full width of the slot 25 is 7 feet, the three right hand segments may be each of one foot width as seen in the bottom view of FIGURE 5. This would permit stopping off the slot to provide 6, 5 or 4 foot widths of spread. Alternatively, the spread width may be adjusted by a large stopper member (not shown) inserted in the interior of the cylinder 15 through the end of the cylinder. Of course, access to the interior of the cylinder is provided at one end by a removable cap 36. Screwthreads may be provided on the exterior of the cylinder 15 and the interior of the cap 36 so that the cap may be removed. For example, with the stopper not in place, the spread width may be 7 feet, while spread widths 6, 5, and 4 feet are provided by inserting the stopper along with an appropriate length spacer. The stopper and spacer would of course be forced, as far as possible to the right (as viewed in FIGURE 2) due to the air pressure when the spreader is operating and so no other holding means would be necessary.

After passing down through the baffles 27, the dry cement or other material being spread will be separated from the air which was used to force it out of the tank, and so it will be deposited on the roadbed while producing a minimum of dust. The spread of a cloud of dust resulting from the dispensing operation may be further minimized, however, by providing a shield or windbreaker in the form of a strip 40 composed of rubber or like flexible material. This strip 40 is fixed to the lower edge of the front cover plate 32 by means including an elongated sheet metal strip 41 along with suitable bolts or other fastening means. The size or width of this flexible strip 40 is selected so that the edge of the strip will just barely contact the roadbed when the spreader assembly 10 is in an operative position fixed to the rear of a vehicle. The strip will prevent dust, if present, from escaping in the forward direction during the spreading operation, and will also prevent wind from entering the area beneath the aperture 28 and creating dust.

In order to further avoid the spread of a cloud of dust while the apparatus of this invention is in operation, a canopy 42 is provided at the rear of the spreader assembly. The canopy 42 may be composed of canvas or the like, and is suspended behind the rear cover plate 31 by a frame 43 which is pivotally attached to the lower edge of the cover plate. The outer edge of the frame 43 is suspended by the canvas 30 that the canopy may swing up to an operative position flat against the cover plate 31. A suitable fastener, not shown, is provided to hold the canopy in the upper position when storing or transporting the spreader assembly or when the canopy is not needed during the spreading operation as when no wind is present. The canopy functions to prevent dust, if present, from escaping from the material which has just been spread so that by the time the canopy has passed over the deposited material it will have settled on the roadbed rather than being suspended in the air to be blown away from the spreading path. Also the canopy 42, just as the strip 40, prevents wind from entering the area just below the aperture 28 where the material is being deposited.

With reference now to FIGURE 4, another embodiment of the invention is illustrated which utilizes a spiked shaft 50 mounted within the cylinder 15 for the purpose of aiding in distributing the powdered material evenly across the width of the cylinder and in keeping the material agitated while within the cylinder to insure a more uniform spread. Although in the form illustrated in FIGURES 1-3, wherein the powdered material is forced into the cylinder 15 under air pressure, the spread of cement of lime is quite uniform compared to previous methods and apparatus used for this purpose, an auger type spreading device is sometimes required by the specifications imposed by state road building authorities in the specifications for soil stabilized roads. Accordingly, the auger or spiked shaft 50 may be provided as illustrated in FIGURE 4, wherein it is seen that the shaft has a plurality of spikes extending radially outward therefrom to aid distributing the powdered material entering from the hose 13 in both directions toward the outer end of the cylinder 15. The central portion of the shaft is held by suitable bearing devices 51 secured to the top of the cylinder 15, while the shaft is driven by a mechanism such as an impeller 52 mounted on the center of the shaft beneath the position where the powdered material enters the cylinder from the hose 13 as best seen in FIGURE 4a. The impeller is driven by the mixture of air and powdered material and thus turns the auger in a self powered arrangement. Althernatively, the shaft 50 may be turned by an electric motor along with a pulley or reduction gear arrangement, although the impeller as illustrated is much simpler.

While the mechanism for spreading dry powdered material such as cement or lime according to this invention has been described with reference to specific embodiments, it is of course understood that this description is not to be construed in a limiting sense. Various modifications of the disclosed embodiments, as well as other embodiments of the invention, will be apparent to those skilled in the art upon reference to this application. It is therefore contemplated that the appended claims will cover any such modifications or embodiments as fall within the true scope of the invention.

What is claimed is:
1. A spreader assembly for distributing dry powdered material such as dry cement or lime or the like from a vehicle from which the material is delivered under air pressure, comprising: an elongated tube adapted to be carried in a position at the rear of such vehicle above the surface of the ground with the tube extending generally transverse to the path on which material is to be spread, a central portion of the tube adapted to be connected by a flexible hose to the source of the material on said vehicle, the lower side of the tube defining a restricted aperture means extending along a substantial portion of the length of the tube whereby the material blown intot he tube from said hose is forced out through the aperture means, a housing extending from said tube to a position which would be just above the surface of the ground when the spreader assembly is in an operative position, the housing including a plurality of baffles intercepting the path of the material from the aperture means to an exit port at the bottom of the housing, the baffles comprising elongated members slanting downwardly toward the interior of the housing and alternately positioned on opposite sides of the housing whereby the dry powdered material is essentially separated from the air which conveys it out of the vehicle as the material travels from the aperture means in the tube to the exit port, the area of restricted aperture means being substantially less than the area of said exit port.

2. A spreader assembly according to claim 1 wherein a plurality of vertical separators are positioned in said housing spaced according to desired widths of spread and wherein means are provided for stopping off said aperture means for corresponding widths whereby the width of spread may be selected.

3. A spreader assembly according to claim 2 wherein said means comprises a plurality of strips each adjustably secured adjacent said aperture means to stop off portions of the slot and to control the effective width of the aperture means.

4. A spreader assembly according to claim 2 wherein a resilient flap extends from the front side of the housing to about the surface of the ground to perevent spread of dust and prevent wind from entering the area below said exit port.

5. A spreader assembly according to claim 1 wherein the housing is wider at the top than at the bottom and said baffles are closer together at the lower part of the housing than at the top and wherein the lower edge of the back side of the housing terminates above the lower edge of the front side of the housing to provide an air exit.

6. A spreader assembly according to claim 1 including an agitator suspended within said tube and movable to aid in distributing the material along the length of the tube and cleaning said tube.

7. A spreader assembly according to claim 6 wherein the agitator is rotated by means of an impeller turned by the material entering the tube from said hose.

8. A spreader assembly according to claim 6 wherein the agitator is moved by the material entering the tube from said hose.

9. A spreader assembly according to claim 1 wherein said aperture means is a slot.

10. A spreader assembly according to claim 1 further including means adjustably secured adjacent to said restricted aperture means for controlling the total area of said aperture means.

References Cited
UNITED STATES PATENTS

| | | | |
|---|---|---|---|
| 1,745,938 | 2/1930 | Lawder | 222—238 |
| 2,376,018 | 5/1945 | Sohmer | 222—564 X |
| 3,013,695 | 12/1961 | Caldwell | 222—193 |

FOREIGN PATENTS

| | | |
|---|---|---|
| 1,012,495 | 7/1952 | France. |

ROBERT B. REEVES, *Primary Examiner.*

HADD S. LANE, *Examiner.*